United States Patent [19]

Eckardt et al.

[11] Patent Number: 4,881,958
[45] Date of Patent: Nov. 21, 1989

[54] ADSORPTION DEVICE FOR GAS SEPARATION

[75] Inventors: Bernd Eckardt, Bruchkoebel; Thomas Burbach, Dietzenbach, both of Fed. Rep. of Germany

[73] Assignee: Siemens Aktiengesellschaft, Munich, Fed. Rep. of Germany

[21] Appl. No.: 240,944

[22] Filed: Sep. 6, 1988

[30] Foreign Application Priority Data

Sep. 3, 1987 [DE] Fed. Rep. of Germany ....... 3729517
Jul. 18, 1988 [EP] European Pat. Off. ........ 88111539.8

[51] Int. Cl.⁴ ............................................. B01D 53/04
[52] U.S. Cl. ........................................ 55/179; 55/66; 55/208; 55/269; 55/387; 55/389
[58] Field of Search ............... 55/66, 74, 75, 179, 55/180, 208, 267-269, 387, 389

[56] References Cited

U.S. PATENT DOCUMENTS

| | | | |
|---|---|---|---|
| 1,948,779 | 2/1934 | Abbott et al. | 55/180 X |
| 2,071,868 | 2/1937 | Von Lüde | 55/267 X |
| 2,303,333 | 12/1942 | Dauphinee | 55/387 X |
| 2,434,419 | 1/1948 | Laughlin et al. | 55/179 X |
| 3,103,425 | 9/1963 | Meyer | 55/179 X |
| 3,164,452 | 1/1965 | Westeren et al. | 55/179 X |
| 3,264,803 | 8/1966 | Read | 55/208 |
| 3,335,550 | 8/1967 | Stern | 55/208 |
| 3,415,069 | 12/1968 | Hauser | 55/66 X |
| 3,501,923 | 3/1970 | Lehmer | 55/66 X |
| 3,668,881 | 6/1972 | Thibault et al. | 55/208 X |
| 3,683,589 | 8/1972 | Seitz et al. | 55/66 X |
| 3,734,293 | 5/1973 | Biskis | 55/179 X |
| 3,791,107 | 2/1974 | Gustavsson | 55/179 |
| 3,850,592 | 11/1974 | Huffman | 55/179 X |
| 4,038,060 | 7/1977 | Kamiya et al. | 55/66 X |
| 4,283,367 | 8/1981 | Koeppe et al. | 55/66 X |
| 4,369,048 | 1/1983 | Pence | 55/66 |
| 4,447,353 | 5/1984 | Pence et al. | 55/66 X |
| 4,562,000 | 12/1985 | Ringel | 55/66 X |

FOREIGN PATENT DOCUMENTS

| | | | |
|---|---|---|---|
| 2950983 | 4/1980 | Fed. Rep. of Germany | 55/387 |
| 3214825 | 9/1986 | Fed. Rep. of Germany | |
| 580600 | 11/1924 | France | 55/267 |
| 54-125176 | 9/1979 | Japan | 55/179 |
| 61-192324 | 8/1986 | Japan | 55/179 |
| 674771 | 8/1979 | U.S.S.R. | 55/179 |
| 814413 | 3/1981 | U.S.S.R. | 55/387 |
| 2118761 | 11/1983 | United Kingdom . | |

OTHER PUBLICATIONS

Kerntechnik, vol. 16, No. 12, 1974, pp. 528-532; H. Stechemesser et al.: "Ein Spaltgasseparator mit Geschlossenem Stickstoff-Kreislauf"; pp. 529-530. FIG. 3.
BBC-Nachrichten, vol. 53, No. 1/2, Jan./Feb. 1971, pp. 32-36; K. Manhart et al.: "Aufgabe und Auslegung der Gasreinigungsanlage des Thorium-Hochtemperatur-Reaktors"; pp. 35-36, FIGS. 1,4.

Primary Examiner—Robert Spitzer
Attorney, Agent, or Firm—Herbert L. Lerner; Laurence A. Greenberg

[57] ABSTRACT

An adsorption device for gas separation with an adsorbent includes a thermally insulated container. Adsorber tubes with a given length are vertically disposed in the container for receiving adsorbent. A heating device is adjacent the adsorber tubes. Cooling tubes are disposed alongside the adsorber tubes and extend over substantially all of the given length for receiving coolant. A gas circulation device in the container generates a gas flow encompassing the heating device, the cooling tubes and all of the given length of the adsorber tubes.

18 Claims, 4 Drawing Sheets

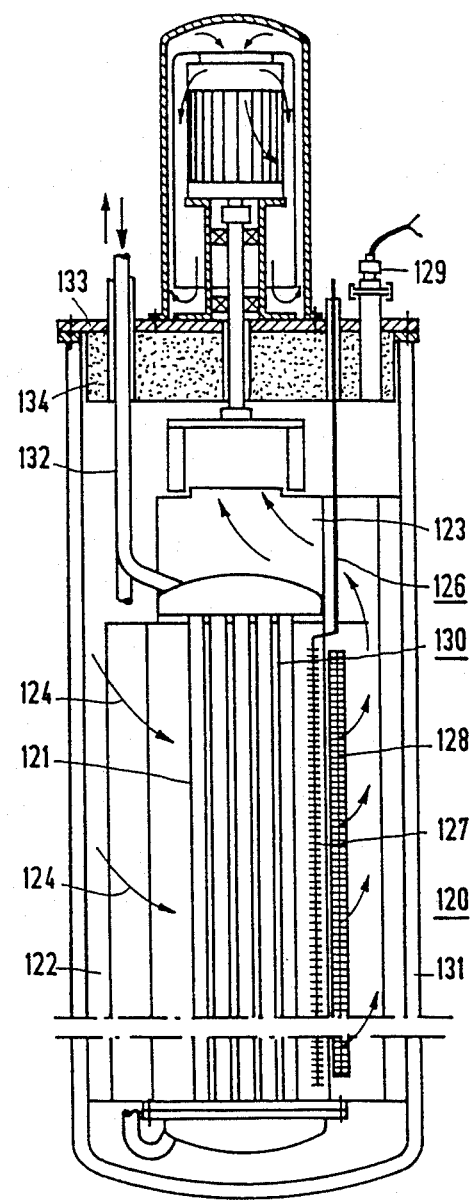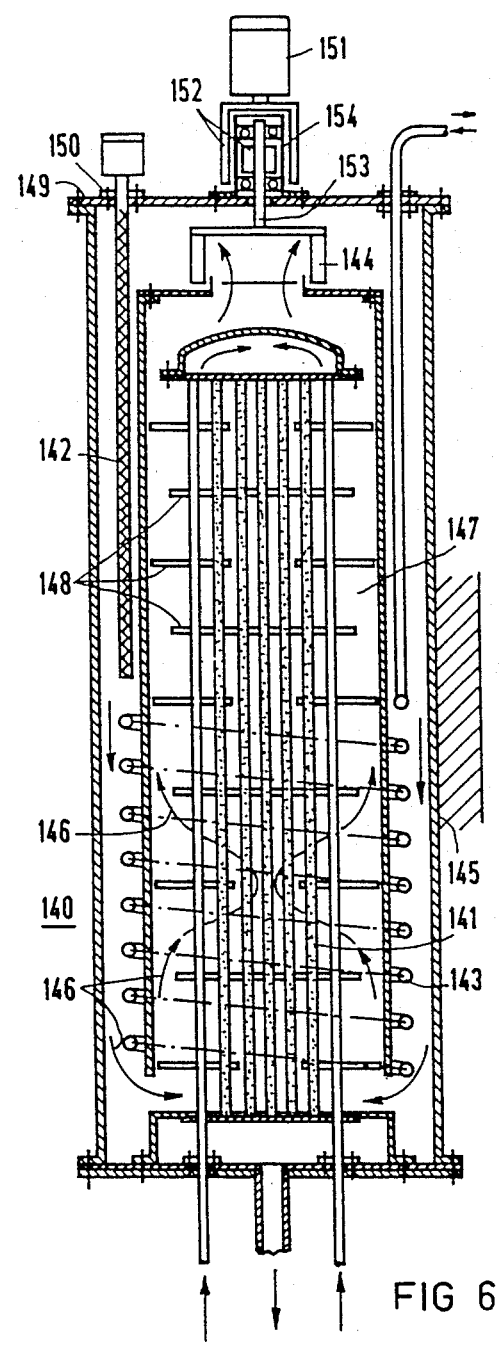
FIG 4
FIG 6

ADSORPTION DEVICE FOR GAS SEPARATION

SPECIFICATION:

The invention relates to an adsorption device for gas separation having an adsorbent, preferably activated charcoal, particularly for the adsorption of radioactive krypton and/or xenon, tubes containing the adsorbent extending vertically in a thermally insulated container, an adjoining heating device, and a coolant. The adsorption device should also be suitable for treating carbon dioxide and/or nitrogen oxides and optionally for filtering out moisture. Zeolites are preferably used as adsorbents. In an adsorption device known from German Patent DE-PS No. 32 14 825, corresponding to U.K. Application No. 2 118 761 A, with which krypton is to be filtered out by means of activated charcoal, both the cooling desired for the adsorption and the heating of the adsorbent, which is needed for expelling the agglomerated krypton, are unsatisfactory because the temperature distribution is largely unhomogenous. This causes thermal stresses and therefore continuous alternating strains, because gas separation using an adsorption device necessitates a continuous alternation between cooling and heating. In the fission gas separator described in the journal "Kerntechnik" [Nuclear Technology] 1974, No. 12, pp. 528–532, a container is filled with liquid nitrogen serving as a coolant, so that adsorber cartridges, tube heaters, level sensors and the like hanging from the container lid experience a flow of this coolant around them. For desorption, the nitrogen is supposed to be evaporated first with the tube heater, and then the activated charcoal traps are to be heated by thermal radiation to 300° C. This is very energy-intensive and the apparatus is not simple. Rapid alternations between adsorption and desorption are practically impossible.

It is accordingly an object of the invention to provide an adsorption device for gas separation, which overcomes the hereinafore-mentioned disadvantages of the heretofore-known devices of this general type, which attains a uniform temperature distribution with inexpensive apparatus so that the low temperature strains permit frequency alternations in operation, and which can still be used on a large industrial scale, even with small-scale production.

With the foregoing and other objects in view there is provided, in accordance with the invention, an adsorption device for gas separation with an adsorbent, preferably activated charcoal, particularly for the adsorption of radioactive krypton and/or xenon, comprising a thermally insulated container, adsorber tubes with a given length being vertically disposed in the container for receiving adsorbent, a heating device adjacent the adsorber tubes, cooling tubes disposed alongside the adsorber tubes and extending over substantially all of the given length for receiving coolant, and a gas circulation device in the container generating a gas flow encompassing the heating device, the cooling tubes and all of the given length of the adsorber tubes.

According to the invention, both the cooling device and the heating device which are individual components, are aligned with the adsorber tubes and thus integrated in one container. Due to this construction, it becomes possible to maintain virtually an identical temperature along the adsorber tubes yet at the same time to have only a very slight temperature difference crosswise to the adsorber tube bundle. Heat exchange between the adsorber tubes and the cooling or heating device is intensified by circulating gas, preferably helium, in such a way that a homogeneous temperature distribution and furthermore a considerable reduction in the energy required are attained The gas circulation rate is preferably 100 h$^{-1}$ or more.

The concentric coil of the cooling device can be vertically oriented parallel to the vertically extending adsorber tube bundle, while the heating device need only extend over a portion of the height of the tube bundle and coil. A ventilator can advantageously be disposed in the remaining space. The gas circulation is driven by this ventilator, which makes for fast heat transmission.

The ventilator is disposed downstream of the heating and cooling elements, as expressed in terms of the flow direction, so that in addition to pumping gas, it makes the circulating flow of gas more thermally uniform at the same time, prior to the entry of the gas into the adsorber tube bundle, and reliably prevents areas of dissimilar temperature from forming in the gas.

Moreover, the pressure loss in the gas circulation region should be selected in such a way that a multiple pressure loss, perhaps having a factor of two or more and possibly as high as ten, results over the adsorber tube bundle, as compared with the pressure loss of the remaining flow course. As a result, a largely uniform velocity of the flow approaching the adsorber tube bundle is attained and thus both a variable thermal strain on the material and differences in adsorbency in the adsorbent are avoided.

The drive motor of the ventilator can advantageously be disposed outside the container, so that it functions at normal temperatures In such a case, its lost heat need not be dissipated through the cooling device. The drive motor may be surrounded by a gas-tight capsule, which at the same time serves as a cooling jacket and is flanged to the container. This avoids leakage losses along the shaft that must be ducted through the container wall.

A particularly advantageous embodiment of the adsorption device according to the invention is provided by joining the tube bundle, the coil and the heating device to one another and suspending them as a unit within the container. The container is advantageously provided at its upper end with an opening having the same cross section as the interior and it is closed with a flanged cap. The unit can be inserted all at once through this opening and lifted back out again as needed. By integrating all of the necessary functional elements in one container, the particular advantage of comparatively low pressure losses is attained, so that with a low energy input, it is possible to apply high gas circulation rates of 1000 h$^{-1}$ or more, for example, which even out the temperature.

The adsorption device according to the invention can advantageously be used for various purposes, because of its advantageous structure and the associated economies. However, it is particularly favorable to use it in a system having at least two parallel branches, in which one adsorption device functions as an adsorber while the other is being regenerated. In this application, a continuous operation is attainable even though each of the adsorption devices operates intermittently. Moreover, by shifting the energy (quantity of heat or cold) stored in the adsorption devices from one branch to the other parallel branch by means of a composite gas circulation (helium-composite circulation), a recuperative exploitation of energy can be accomplished. This permits the reduction of the energy needed by approximately 30 to 50%. Such applications occur particularly in nuclear technology, such as in the reprocessing of nuclear fuels, in which krypton and/or xenon nuclides are to be separated out from a gas mixture and stored separately. Correspondingly, however, an advantageous application is also possible in cleaning and/or drying a gas mixture by the adsorption of nitrogen oxides, carbon dioxide and moisture.

Other features which are considered as characteristic for the invention are set forth in the appended claims.

Although the invention is illustrated and described herein as constructed in an adsorption device for gas separation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a longitudinal-sectional view of an adsorption device according to the invention having an adsorber tube bundle which is not constructed in the form of a circular ring;

FIG. 6 is a longitudinal-sectional view of an adsorption device according to the invention, in which the thermal carrier gas flows through the adsorber tube bundle in the longitudinal and transverse directions.

Figure 1:
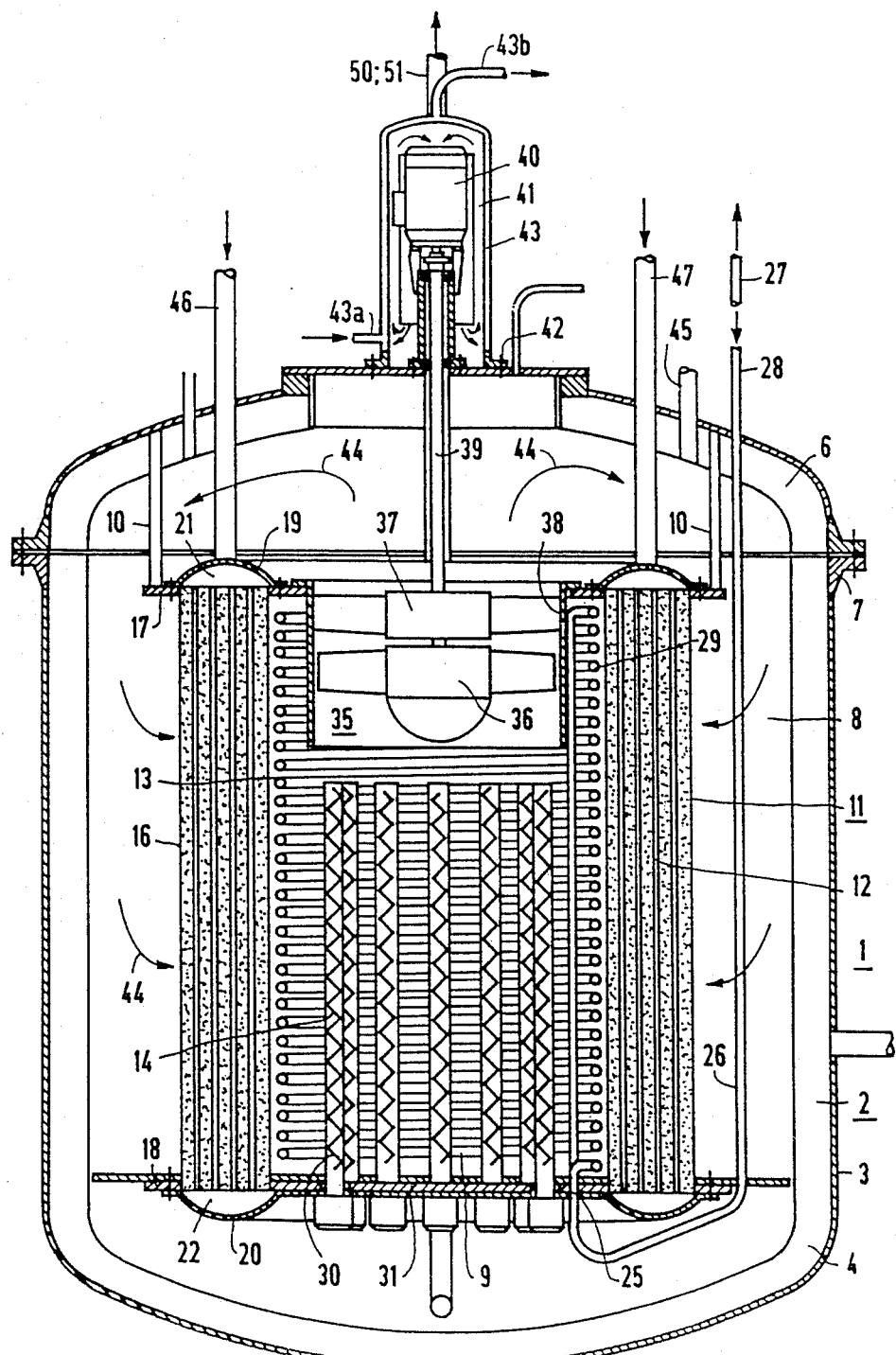
FIG. 1 is a fragmentary, diagrammatic, longitudinal-sectional view of an adsorption device according to the invention, having an adsorber tube bundle constructed in the form of a circular ring.

Referring now to the figures of the drawings in detail and first, particularly, to FIG. 1 thereof, there is seen an adsorption device 1 according to the invention which includes a container 2 having a metal outer wall 3 and heat insulation means 4, which may be constructed as either solid insulation or vacuum insulation. By way of example, the container 2 has a diameter of 2 meters and a height of 3 meters. The top is constructed as a cap 6, which is secured with a flange connection 7. As the drawing shows, the opening provided with the cap has the same cross section as the interior 8 of the container 2.

Beneath the cap 6, anchors 10 protrude from the cap 6 into the interior 8. An adsorber unit, identified as a whole by reference numeral 11 and including a tube bundle 12, a cooling device 9 and a heating device 14, is retained on the anchors 10.

The tube bundle 12 is formed of a great number of vertically disposed tubes 16, which are mutually-parallel over an area defined by a circular ring. The inside diameter of the ring is one meter, for example. At the top and bottom, the tubes 16 are set in tube sheets or plates 17 and 18, on which arched sheet-metal rings 19 and 20 are secured, to form collecting chambers 21 and 22. The tubes 16 have a diameter of 35 mm, for example, and contain activated charcoal having a settled apparent or bulk density of 0.45 kg/l. The tubes 16 are grouped so closely together that the distance between the tubes is less than the tube diameter.

The cooling device 9 includes a tube coil 13 in the interior of the tube bundle 12. The tube coil may be cylindrical, in a single layer. The ends of the tube coil are joined by incoming lines 25 and outgoing lines 26 to respective external connections 27 and 28 which are extended out of the container 2. The connection 28 leads to a non-illustrated refrigerating machine, with which liquid nitrogen can be carried into the container interior 8 as a secondary coolant, in order to generate a temperature of less than $-130°$ C. A tube 29 of the tube coil has a diameter of 20 mm, for example. The spacing between the tube coil 13 and the inside diameter of the tube bundle 12 is on the same order of magnitude.

The heating means 14 are disposed in the center of the container interior 8 and thus in the interior of the tube bundle 12 and the tube coil 13 as well. The heating means 14 include electrical heating rods 30, which extend parallel to one another vertically upward from a lower support plate 31. The support plate 31 may be formed in one piece with a lower tube plate 18 of the tube bundle 12. The support plate holds the heating rods which, for instance, are grouped in a circular ring and spaced apart by the thickness of the heating rod, in the interior of the tube coils 13.

The height of the heating rods 30 is less than the height of the tube bundle 12 and the tube coils 13. In the interior, this leaves a space 35, in which a ventilator 36 is disposed. The ventilator may instead be disposed above the tube bundle, beneath the container cap. The ventilator 36 is seated with a star-shaped holder 37 in a jacket 38. The holder 37 is guided through the top of the container 2 with a driveshaft 39 leading to a drive motor 40, which is secured on the cap 6 outside the container 2. The motor 40 is surrounded by a gas-tight capsule 41, which is secured in a gas-tight fashion on the cap 6 with a flange connection 42. The capsule 41 is constructed as a double-walled cooling jacket 43, in order to dissipate the heat of the motor, and the cooling jacket has a coolant inlet $43a$ and a coolant outlet $43b$.

The interior 8 of the container 2 contains helium at a pressure of 1 bar, for example. The helium serves as heat transmission means and is circulated through the container interior 8 in the direction of arrows 44 by the ventilator 36. In the course of circulation, the helium travels past the tube bundle 12 and is either cooled with the tube coil 13 or heated with the heating device 14. The circulation rate is 1000 $h^{-1}$ or more.

With the cooling, the agglomeration of the noble gases krypton and xenon onto the activated charcoal in the tubes 16 of the tube bundle 12 is reinforced whenever a gas mixture to be cleaned is carried through connections 46 and 47 into the tube bundle 12. The cleaned gas is removed through respective gas outlets 50 and 51, one of which is located behind and the other of which is located in front of the plane of the drawing After the agglomeration, krypton and xenon can then be expelled by heating the activated charcoal with the aid of the heating device 14, the heat from which is also transmitted to the tubes 16 with the ventilator.

Figure 2:
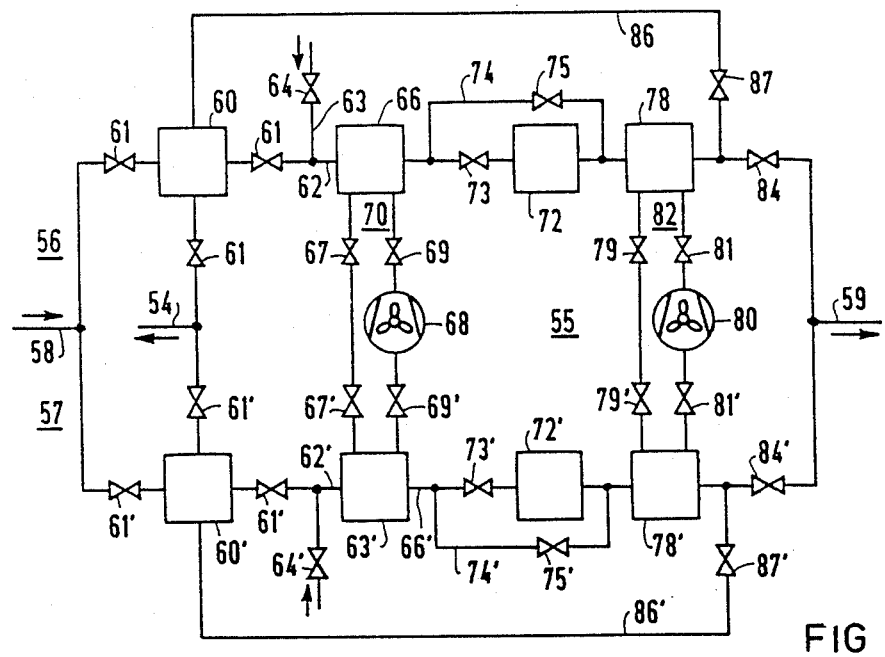
FIG. 2 is a schematic circuit diagram illustrating the use of two adsorption devices in one continuous-functioning system for the separation of noble gases.

FIG. 2 shows an adsorption system 55 for quasi-continuous operation for the separation of xenon and krypton from fission gases that occur in fuel assembly processing. The system 55 includes two identical pipe sections 56 and 57, which are mutually parallel and are connected to an inlet 58 for the gases to be cleaned and an outlet 59 for the noble gases, while an outlet for the cleaned gases is provided at reference numeral 54. Each of the two identically constructed pipe sections 56, 57 includes a precooler 60, 60', which can be shut off by means of valves 61, 61'. A line 62, 62', which is provided with an inlet 63, 63' for a carrier gas and a valve 64, 64', leads to a first adsorption device 66, 66', which is constructed like the adsorption device 1 of FIG. 1. The adsorption devices 66, 66' communicate directly with one another through valves 67, 67'. There is also a connection through a ventilator 68, which can be blocked off by means of valves 69, 69'. With suitable open and closed-loop control of the system 55, a countercurrent heating/cooling operation and heat exchange between the adsorption devices 66, 66' can thus take place through a circuit 70.

An intermediate cooler 72, 72', which can be blocked off through a valve 73, 73' and is bypassed by a bypass line 74, 74' having a valve 75, 75', is connected to the outlet side of the adsorption devices 66, 66'.

A second adsorption device 78, 78' is located downstream of the intermediate cooler 72, 72'. A closed circuit 82 is formed between the adsorption devices 78 and 78' through valves 79, 79' and a ventilator 80 having valves 81 and 81' upstream and downstream of the ventilator, with which heat exchange can be performed between the adsorption devices 78 and 78'.

The ends of the pipe sections 56, 57 can be blocked off through respective valves 84, 84'. A bypass line 86, 86' having a valve 87, 87' branches off upstream of the valve 84, 84' and leads to the precooler 60, 60'. The gas cleaned in the pipe section (in this case 56) functioning as an adsorber is carried through the line 86 to the outlet 54.

The pipe section 57 is regenerated at this same time. With continuous heating in the adsorption devices 66', 78', they are exposed to scavenging gas, for instance helium, which is fed into the inlet 63'. The scavenging gas flows through the adsorption devices 66', 78', bypassing the intermediate cooler 72' through the line 74'. With the scavenging gas, the noble gases are then removed through the outlet 59.

Figure 3:
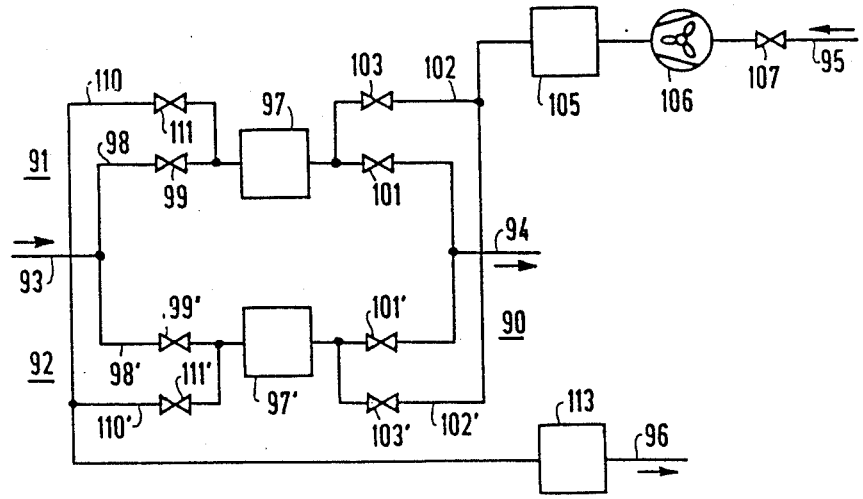
FIG. 3 is a schematic circuit diagram illustrating the use of the adsorption device in a continuous-function system for the retention of nitrogen oxides and moisture.

FIG. 3 shows an adsorption system 90 for quasi-continuous operation for separating out moisture and nitrogen oxides from the dissolution gas or waste cell gas that is produced in fuel assembly processing. The system 90 may be connected to an adsorption system 55 as shown in FIG. 2 for noble gas separation, as a preceding adsorption system, or it can be used in closed circuit operation for cleaning the cell atmosphere.

The system includes two identical pipe sections 91 and 92, which are mutually parallel and are connected to an inlet 93 for the gas mixture to be cleaned and an outlet 94 for the cleaned gases, while an inlet for the scavenging gas used for regeneration is shown at reference numeral 95 and an outlet for the scavenging gas is provided at reference numeral 96. The outlet 94 is optionally connected to the inlet 58 of the adsorption system 55 of FIG. 2.

The identically constructed pipe sections 91, 92 each include one respective adsorption device 97, 97' which is equivalent in structure to the adsorption device 1 of FIG. 1 or the adsorption device to be described below in conjunction with FIG. 4. Zeolites are used in this case as the adsorbents.

From the inlet 93, a line 98, 98' leads through a valve 99, 99' to the adsorption device 97, 97' and from there through a valve 101, 101' to the outlet 94. The adsorption device 97, 97' also communicates through a line 102, 102', which has a valve 103, 103', with a heating device 105. The heating device 105 is preceded by a ventilator 106, which can be blocked off by a valve 107 and communicates with the scavenging gas inlet 95. A line 110, 110' having a valve 111, 111' is connected with a cooler 113 and with the scavenging gas outlet 96 disposed downstream.

While one pipe section (in this case 91) operates in the adsorptive gas cleaning mode, the valves 99 and 101 are open, and the gas flows through the adsorption pipe section from the inlet 93 to the outlet 94. The heat of adsorption that is thereby liberated is removed through the cooling device 9 of FIG. 1, which is integrated with the adsorption device 97, and the adsorber filling is thus kept at a certain temperature, for instance 10° C. The valves 103 and 111 are closed during this time. At the same time, the parallel pipe section 92 is being regenerated To this end, the adsorption device 97' is exposed to scavenging gas by means of the ventilator 106 and the heating device 105, with the valve 103' and 107 being opened and the scavenging gas being drawn in at the inlet 95. In this process the adsorption device 97' is heated with the heating device 14 of FIG. 1 to a regeneration temperature, for instance, 250° C. After leaving the adsorption device 97', the scavenging gas is carried through the opened valve 111' and the line 110' to the cooler 113, and is subsequently removed through the outlet 96, along with the moisture and nitrogen oxides still existing downstream of the cooler.

The outlet 96 may communicate with process units, into which the desorbed nitrogen oxides are recycled, and which are connected to the upstream side of the adsorption system 90.

Particularly advantageously, the scavenging gas inlet 95 can communicate with the outlet 54 of the adsorption system 55 of FIG. 2, so that the supply of scavenging gas to the adsorption system 90 is effected with clean gas from the adsorption system 55 of FIG. 2.

FIG. 4 shows an adsorption device 120, in which unlike the adsorption device of FIG. 1, the tube bundle 121 is not in the form of a circular ring. The geometry of the tube bundle 121 is configured as a section of the tube bundle of FIG. 1 in the form of a square or rectangle. In order to guide the heat carrier gas circulated in the container interior 122, a guide device 123 is provided which assures that the flow approaches the tube bundle 121 horizontally, in the direction of arrows 124.

In this case the circulated heat carrier medium is cooled with a cooling device 126, which is formed of coolant-carrying heat exchanger tubes made of ribbed tubing 127 extending in the vertical direction parallel to the adsorber tube bundle 121. Alternatively, the heat carrier medium may be heated with an electric heating device 128, the connecting lines of which are conducted to the outside with a duct 129.

The adsorber tube bundle 121 is again suspended in the container 131 as a unit 130, together with the heating and cooling devices 127, 128 and the guide device 123. The unit 130 is retained through anchors as well as through gas supply and removal lines 132, which are secured on a container cap 133.

Figure 5:
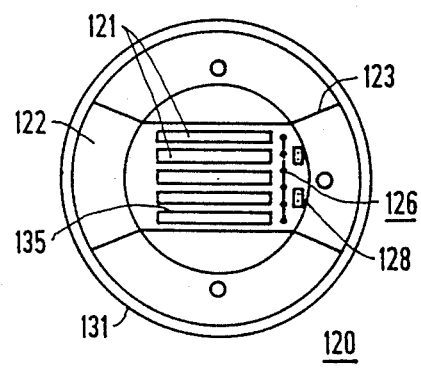
FIG. 5 is a cross-sectional view of the adsorption device of FIG. 4, having modified adsorber tubes.

The adsorber container 131 is constructed as a double-walled, vacuum-insulated container, and the container cap 133 is filled with a powdered mineral insulation 134. The adsorption device 120 is particularly advantageously usable for cleaning gas mixtures with low to medium volumetric flows, for instance of 50 m³/h. If larger quantities of adsorbent are needed for cleaning larger volumetric flows, then the adsorbent can be accommodated in tubes 135 with a rectangular cross section, as shown in the cross-sectional view of FIG. 5, instead of in cylindrical tubes. In this case a plurality of tubes 135 are disposed beside one another, with their longitudinal direction parallel to the gas flow. The tubes are sprayed-on over the entire length of the long sides thereof, before the gas flow meets the cooling device 126 and the heating device 128.

FIG. 6 shows a further embodiment in the form of an adsorption device 140, again having the advantages of the integration of all the functional elements, such as an adsorber tube bundle 141, a heating device 142, a cooling device 143 and a gas circulation device or ventilator 144, inside a thermally insulated container 145.

The heat carrier medium, such as helium or nitrogen, is circulated in the direction of arrows 146 in the container interior 147 by means of a ventilator 144 and in so doing flows through the adsorber tube bundle 141 under the influence of baffle plates 148. The cooling device 143 is provided in the form of a tube coil guided concentrically about the tube bundle. The heating device 142 is ducted in the form of electrical heating rods from the outside through a container cap 149, to which it is secured with flanges 150.

A drive unit 151 of the ventilator 144 is accommodated on the cap 149 outside the container 145. The drive unit functions through a magnet coupling 152. A half of the magnet coupling 152 secured to a ventilator shaft 153 is mounted inside a gas-tight capsule 154, which is flanged to the container cap 149, in order to prevent leakage to the outside through the ventilator shaft 153.

We claim:

1. Adsorption device for gas separation with an adsorbent, comprising a thermally insulated container, adsorber tubes with a given length being vertically disposed in said container, adsorbent disposed in said adsorber tubes, a heating device adjacent said adsorber tubes, cooling tubes disposed alongside said adsorber tubes and extending over substantially all of said given length for receiving coolant, and a gas circulation device in said container generating a gas flow encompassing said heating device, said cooling tubes and all of said given length of said adsorber tubes.

2. Adsorption device according to claim 1, including means for directing the gas flow from said gas circulation device first past said adsorber tubes, and then past at least one of said heating device and said cooling tubes.

3. Adsorption device according to claim 1, wherein the gas flow occurs in a given direction, and said adsorber tubes have a rectangular cross section and a longitudinal direction being the same as said given direction.

4. Adsorption device according to claim 1, wherein said gas circulation device circulates the gas flow at a rate of at least 100 h$^{-1}$.

5. Adsorption device according to claim 1, wherein said adsorber tubes form a tube bundle having a circular-ring cross section, said cooling tubes form a cylindrical tube coil concentric to said tube bundle, and said heating device is electric and is disposed in the center of at least one of said tube bundle and said tube coil.

6. Adsorption device according to claim 5, including means for directing the gas flow from said gas circulation device toward said tube bundle in horizontal direction, and the gas flow has a pressure loss over said tube bundle being at least twice as high as the pressure loss of the gas flow over the remainder of the circulation of the gas flow.

7. Adsorption device according to claim 6, wherein said heating device extends only over a portion of said given height of said adsorber tubes of said tube bundle and only over a portion of the height of said tube coil defining a space remaining in said tube bundle and in said tube coil, and said gas circulation device is in the form of a ventilator disposed in said remaining space.

8. Adsorption device according to claim 7, including a container cap in which said ventilator is disposed directly above said tube bundle.

9. Adsorption device according to claim 7, including a drive motor for said ventilator disposed outside said container.

10. Adsorption device according to claim 9, including a gas-tight capsule flanged to said container and surrounding said drive motor.

11. Adsorption device according to claim 10, wherein said capsule is double walled and has an intermediate space in which coolant circulates.

12. Adsorption device according to claim 9, including a ventilator shaft connected between said ventilator and said drive motor, a magnet coupling disposed between said drive motor and said ventilator, and a gas-tight capsule flanged to said container and surrounding at least part of said ventilator shaft and of said magnet coupling.

13. Adsorption device according to claim 5, wherein said tube bundle, said tube coil and said heating device are joined to one another and suspended as a unit inside said container.

14. Adsorption device according to claim 13, including anchors protruding into the interior of said container and suspending said unit.

15. Adsorption device according to claim 14, including a container cap disposed on said container, and inflow and removal lines additionally suspending said unit on said cap.

16. Adsorption device according to claim 1, including means for connecting the interior of said container to a pressure-equalizing chamber disposed outside said container.

17. Adsorption system, comprising at least two parallel branches, and two adsorption devices each being connected in a respective one of said parallel branches, one of said adsorption devices functioning as an adsorber while the other of said adsorption devices is regenerated, each of said adsorption devices including a thermally insulated container, adsorber tubes with a given length being vertically disposed in said container, adsorbent disposed in said adsorber tubes, a heating device adjacent said adsorber tubes, cooling tubes disposed alongside said adsorber tubes and extending over substantially all of said given length for receiving coolant, and a gas circulation device in said container generating a gas flow encompassing said heating device, said cooling tubes and all of said given length of said adsorber tubes.

18. Adsorption system according to claim 17, including a heat exchange circuit connected between said adsorbers of said parallel branches.

* * * * *